(12) United States Patent
Kim (10) Patent No.: US 8,947,250 B2
(45) Date of Patent: Feb. 3, 2015

(54) APPARATUS AND METHOD FOR ALERTING A STATE OF A PORTABLE TERMINAL

(71) Applicant: Samsung Electronics Co., Ltd., Gyeonggi-do (KR)

(72) Inventor: Kyunghwa Kim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 101 days.

(21) Appl. No.: 13/670,577

(22) Filed: Nov. 7, 2012

(65) Prior Publication Data

US 2013/0147629 A1 Jun. 13, 2013

(30) Foreign Application Priority Data

Dec. 8, 2011 (KR) .................. 10-2011-0130771

(51) Int. Cl.
| | |
|---|---|
| *G06F 3/041* | (2006.01) |
| *G08B 5/00* | (2006.01) |
| *H04M 1/00* | (2006.01) |
| *H04M 1/725* | (2006.01) |
| *H04M 19/04* | (2006.01) |

(52) U.S. Cl.
CPC . *G08B 5/00* (2013.01); *H04M 1/00* (2013.01); *H04M 1/72563* (2013.01); *H04M 19/04* (2013.01); *H04M 2250/12* (2013.01); *H04M 2250/52* (2013.01)
USPC ................ 340/686.1; 340/539.11; 340/691.6; 345/156; 345/173; 361/679.09

(58) Field of Classification Search
USPC ........ 340/539.11, 691.6; 455/414.1; 345/156, 345/173; 361/679.09
See application file for complete search history.

(56) References Cited

U.S. PATENT DOCUMENTS

| | | | | |
|---|---|---|---|---|
| 2004/0110544 | A1* | 6/2004 | Oyagi et al. | ................ 455/575.1 |
| 2010/0173672 | A1* | 7/2010 | Kuhl et al. | ..................... 455/557 |
| 2011/0217919 | A1* | 9/2011 | Arend et al. | ....................... 455/1 |
| 2012/0026098 | A1* | 2/2012 | Ladouceur et al. | ........... 345/173 |
| 2013/0100017 | A1* | 4/2013 | Papakipos et al. | ............. 345/158 |

\* cited by examiner

*Primary Examiner* — Brent Swarthout
(74) *Attorney, Agent, or Firm* — Cha + Reiter, LLC (57) ABSTRACT

An alert method in a portable terminal which includes: examining an output of a terminal condition detection unit, detecting a condition in which the portable terminal is tiled when an event to examine a designated condition is received or generated, obtaining the alert information from a memory which stores alert information of the designated condition and default alert information, and producing an alert by displaying information of the designated condition if the portable terminal is in the designated condition.

18 Claims, 6 Drawing Sheets

FIG. 6

# APPARATUS AND METHOD FOR ALERTING A STATE OF A PORTABLE TERMINAL

CLAIM OF PRIORITY

This application claims the benefit under 35 U.S.C. §119(a) to a Korean patent application filed on Dec. 8, 2011 in the Korean Intellectual Property Office and assigned Serial No. 10-2011-0130771, the entire disclosure of which is hereby incorporated by reference.

BACKGROUND OF THE INVENTION

1. Field of the Invention

The present invention relates to an apparatus and a method for producing an alert generated from a state of a portable terminal, and more particularly, to an apparatus and a method for activating different alerts according to the state of a terminal.

2. Description of the Related Art

A portable terminal transmits and receives various types of events through a communication unit. An event may be receiving a voicemail, voice message, a voice phone call, or receiving a text message. In this case, the portable terminal performs the same notification alert according to the type of event received thereto. For example, in the case where a message is received and a user needs to be notified thereof, if a display unit such as a liquid crystal display ("LCD"), is turned off, the portable terminal activates (or turns on) the display unit and displays information about the received message on the display unit in a pop-up manner. Alternatively, alerts may also be performed in sound (audio) or vibration modes for the same notification purposes.

However, an alert method as described above has limitations in that the notification of event generation is prioritized regardless of the state of the portable terminal, thus resulting in an alert method that lacks a significant amount of sensitivity.

SUMMARY OF THE INVENTION

The present invention has been made in view of the above problems, and provides an apparatus and a method for alerting and notifying the generation of events of various types by detecting the condition of a portable terminal when an event is generated in or received by the portable terminal.

In the present invention, a condition of a portable terminal is detected when an event is generated in the portable terminal and when the portable terminal is in a set condition. Event generation may use a preset image as a means of producing an alert. In this case, when a specific application is set to be executed under specific conditions, the portable terminal may execute the set application when the event is generated while displaying the preset image, thereby producing a notification of the generation of the event.

In accordance with one embodiment of the present invention, an alert apparatus in a portable terminal includes: a communication unit configured to receive an event, a terminal condition detection unit configured to detect a designated condition of the terminal, a memory configured to store alert information of the designated condition in addition to default alert information, and a controller configured to receive an output of the terminal condition detection unit upon detection of the generation of the event from the communication unit. The communication unit is configured to generate the alert information of a designated condition when the terminal is in a designated condition, otherwise it is configured to generate the default alert information. Finally, a display unit is configured to produce an alert of the generated event by displaying alert information under control of the controller.

In accordance with another embodiment of the present invention, a method for producing an alert in a portable terminal includes examining an output of a terminal condition detection unit, which detects a condition in which the portable terminal is tilted. Upon detection of the generation of an event to examine a designated condition, if the portable terminal is in the designated condition, alert information of the designated condition is displayed from a memory which stores the alert information of the designated condition and default alert information.

BRIEF DESCRIPTION OF THE DRAWINGS

The above features and advantages of the present invention will be more apparent from the following detailed description in conjunction with the accompanying drawings, in which.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or similar parts. Detailed descriptions of well-known functions and structures incorporated herein may be omitted to avoid obscuring the subject matter and clarity of the present invention.

The present invention provides an apparatus and a method for notifying and producing an alert from the generation of an event in various forms by detecting a condition of a portable terminal when an event is generated. Here, the event may be receiving a message such as, for example, a short message service (SMS), a multimedia message service (MMS), an email, receiving an incoming call, or receiving feeds on social networking services (SNS) such as Facebook or Twitter.

Briefly, the present invention may detect the current condition or state of the portable terminal, and when an identical event is generated in the portable terminal, an alert is produced from the generation of the event by displaying a preset image if the condition of the portable terminal is in a preset condition. If a specific application is set to be executed when a specific condition occurs, the portable terminal may execute the set application when the event is generated to display a set image, thereby producing an alert upon generation of the event.

In the present invention, when the event is generated in the portable terminal, the condition of the portable terminal is detected. If the condition of the portable terminal is in a preset condition, the generation of the event may produce an alert by using a preset image. Here, the two conditions of the terminal are either when the terminal is mounted on a cradle or when a user is currently using the terminal. If the portable terminal is mounted on the cradle, the corresponding terminal is held at an angle which enables the user to view the terminal. In this case, when the event is generated, the portable terminal may produce an alert by using an event generation alert function in form of an image information such as an icon, an item, and a thumbnail image, a sound that differs from the default alert information, or a preset application, that is set differently from the conventional event generation alert function in the prior art.

In an alternate embodiment, when movement of the terminal is not detected for a predetermined time period while the terminal maintains its position within a set angular range, an alert may be produced by the display method described above. Hereinafter, a condition in which the portable terminal does not move while maintaining a predetermined angle is referred to as a designated condition.

In this case, when a specific application for displaying an alert is set to be executed when a specific condition occurs, the portable terminal executes the set application upon generation of the event to display the preset image, thereby notifying that the event has been generated. In this case, the set application,(for example, a camera application, an internet application, a TV application, and/or a movie application, etc.,) and the set image may be an image preset by a manufacturer or preset by the user.

A detailed explanation of the above teachings according to the present invention is explained hereinafter.

Figure 1:
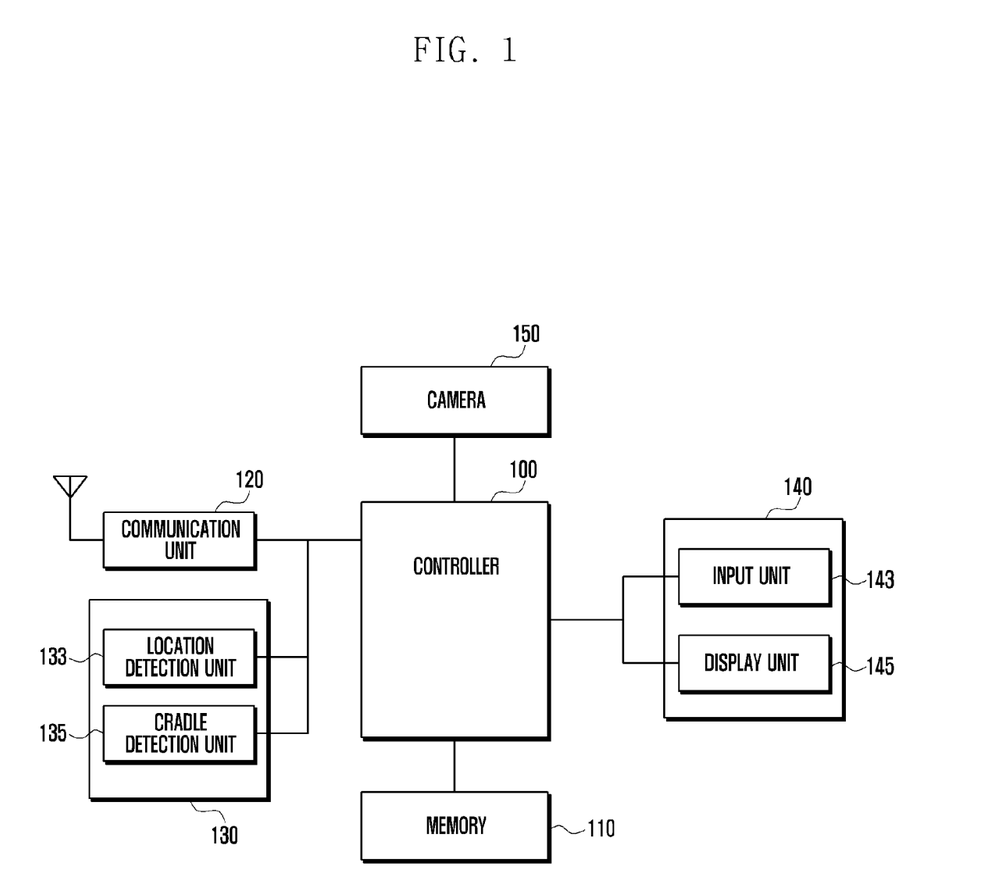
FIG. 1 is a view illustrating a configuration of a portable terminal according to an exemplary embodiment of the present invention.

FIG. 1 is a view illustrating a configuration of a portable terminal according to an exemplary embodiment of the present invention.

Referring to FIG. 1, a communication unit 120 performs a wireless communication function with a base station or other communications device. Here, the communication unit 120 may include a transmission unit, which performs a frequency up conversion and power amplification on a transmission signal, and a reception unit, which performs low noise amplification and a frequency down conversion on a received signal. Also, the communication unit 120 may include a modulation unit and a demodulation unit. Here, the modulation unit modulates the transmission signal sent to the transmission unit and the demodulation unit demodulates a signal received through the reception unit. In this case, the modulation unit/demodulation unit may be LTE, WCDMA, or GSM. Alternatively, the modulation unit/demodulation unit may be WIFI, WIBRO, NFC, Bluetooth, or other units known to those skilled in the art.

A controller 100 controls an overall operation of the portable terminal, and in an exemplary embodiment of the present invention, the controller 100 analyzes the condition of the portable terminal upon generation of the event and produces an alert which causes the generation of a corresponding event in a preset manner when the portable terminal is in a preset condition.

A memory 110 may include a program memory for storing an operation program of the terminal, a program in accordance with an exemplary embodiment of the present invention, and a data memory for storing data generated during execution of the program. In particular, the memory 110, according to an exemplary embodiment of the present invention, may include an alert information table, which stores an application set for controlling event generation if an event is generated when the terminal is in a specific condition and/or alert information, e.g., an image or a sound. Memory 110 also includes a default alert information table which notifies and controls event generation in a normal condition, i.e., when the portable terminal is not in a specific condition.

A terminal condition detection unit 130 performs the function of detecting a condition in which the terminal maintains a position at a specific angle without movement during a set period of time. The terminal condition detection unit 130 may include a position detection unit 133 and a cradle detection unit 135. The position detection unit 133 is a sensor for detecting an angle of tilt and movement of the portable terminal and may be an acceleration sensor such as an accelerometer and/or a geomagnetic sensor. The cradle detection unit 135 performs the function of detecting whether the portable terminal is mounted on the cradle.

An input unit 143 may be a touch panel for detecting a touch input by the user and the display unit 145 may be an LCD or an OLED panel for displaying data generated during execution of the program or an image. The input unit 143 and the display unit 145 may also be touch screen devices. The camera 150 is driven under control of the controller 100 to photograph an image. In an exemplary embodiment of the present invention, it is assumed that the specific application indicates activation and control of the camera 150 to produce a photographic image.

Figure 2:
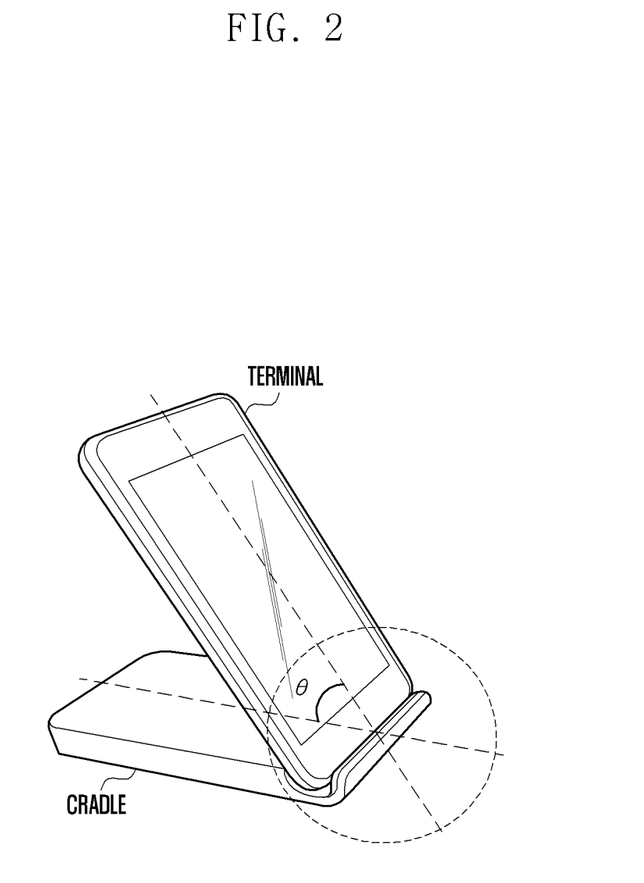
FIG. 2 is a view illustrating a state in which a portable terminal is mounted on a cradle and maintains a predetermined angle.
Figure 3:
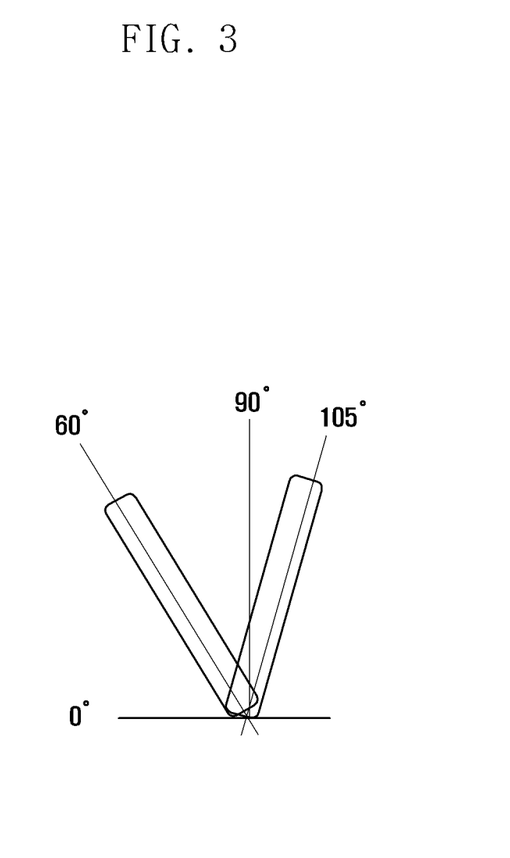
FIG. 3 is a view illustrating an example angle range for setting a designated state in which a terminal is mounted on a cradle according to an exemplary embodiment of the present invention.

FIG. 2 is a view illustrating a state in which a portable terminal is mounted on a cradle and maintains a predetermined angle relative to the cradle. FIG. 3 is a view illustrating an example angular range for setting a designated state in which a terminal is mounted on a cradle according to an exemplary embodiment of the present invention, and FIG. 4 is a view illustrating an example of displaying an alert produced when an event is generated in a terminal in a designated state according to an exemplary embodiment of the present invention.

Figure 4:
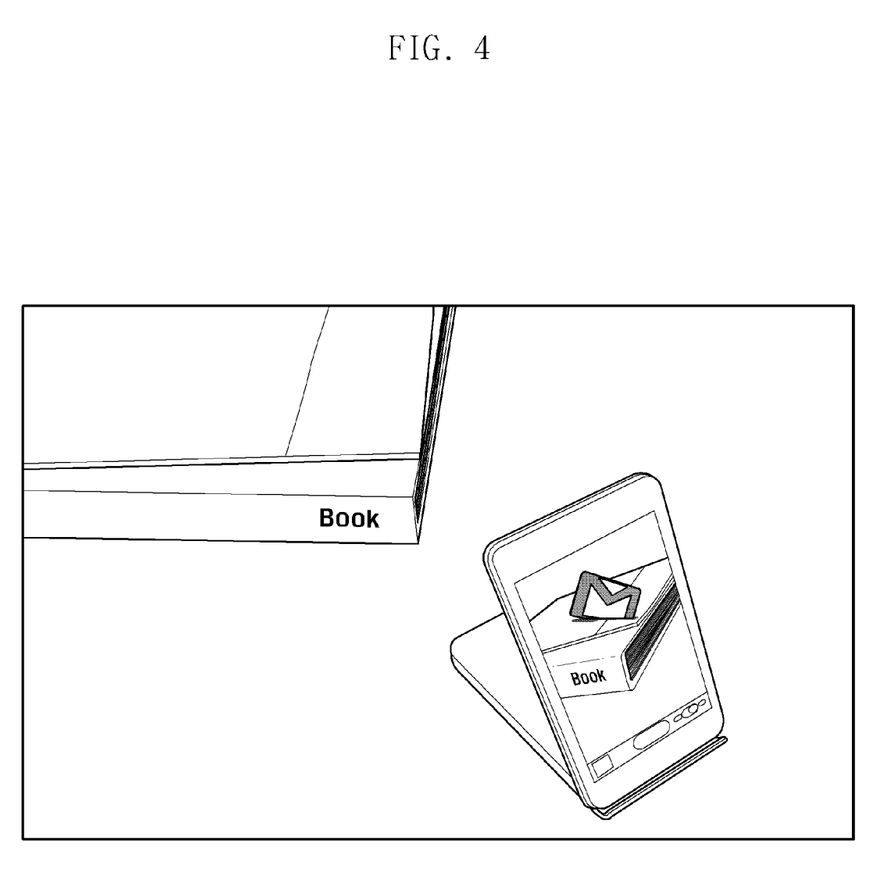
FIG. 4 is a view illustrating an example of producing an alert by displaying when an event is generated in a terminal in a designated state according to an exemplary embodiment of the present invention.

Referring to FIGS. 2 through 4, when an event of receiving a message is generated through the communication unit 120, the controller 100 analyzes the condition (i.e. tilt state) of the terminal at that time. In an exemplary embodiment of the present invention, when the terminal is in the designated condition (i.e. tilted within a predetermined range of angles) when the event is generated, the event generation is notified by the alert information set for that corresponding event. If the terminal is not in the designated condition, the event generation is notified by the alert information set as default.

To this end, the memory 110 respectively stores an event alert corresponding to the designated condition and a default event alert according to other respective events. Here, the event alert in the designated condition may be set as image information, sound information that differs from the default alert information, and/or specific application to display the alert information.

In an exemplary embodiment, when the terminal is mounted on the cradle, this can be set as the designated state. In particular, as shown in FIG. 2, when the terminal is mounted on the cradle, the controller 100 detects that the terminal is mounted on the cradle from the signal generated by the cradle detection unit 135 of the terminal condition detection unit 130. When the terminal is mounted on the cradle, an angle of the terminal from the horizontal orientation may be between 60 to 65 degrees for the user to view the display screen.

In an exemplary embodiment of the present invention, as shown in FIG. 3, the range of tilt angle may be set between 60 degrees to 105 degrees. The range of tilt angle may be a tilt value for securing the terminal firmly within the cradle so that the screen of the terminal can be viewed by the user.

In an exemplary embodiment of the present invention, a tilt value (for example, 65 degrees) is calculated based on a default reference point provided by the cradle. When the application (for example, camera, internet, TV, movie, music, etc.) is activated while maintaining a tilt of 60 to 105 degrees as shown in FIG. 3, if the event alert is generated, the activated application screen(for example, an image photographed by the camera 150) and an alert image icon are superimposed to the display unit 135. Therefore, when the terminal is mounted on the cradle and the tilt angle of the terminal falls within an angle of 60 to 105 degrees, the designated state is detected. In such a case, the event generation is notified by the alert information set for the corresponding event. However, when the tilt of the terminal is out of the above range, or not in the designated condition, the controller 100 generates the default event alert information.

In an exemplary embodiment of the present invention, the event may be detecting, through the communication unit 120, by the generation of a message (SMS or MMS), an email, an incoming call or by generation of the SMS feeds (Facebook or Twitter). When the event is generated, the controller 100 determines whether the terminal is currently in the designated condition (i.e., within a predetermined range of tilt angle) using the terminal condition detection unit 130. The designated condition may also be a condition in which the terminal is placed without movement within a specific range of tilt. When the terminal is in the designated condition, the controller 100 accesses and displays alert information set for the corresponding event generation from the memory 110. In this case, the set alert information may be an image (for example, an icon or a specific thumbnail image), sound and/or vibration, the image and sound being selectable by the user.

When the event is generated in a state that the mobile terminal is tilted a specified angle (ex, mounted cradle), the mobile terminal of the present invention alerts a preset alert information (icon, item, image, sound, application etc) instead of a default event alert (alert information is fixed). The user can set up a sensitive alert unlike default alert.

If the portable terminal is mounted on the cradle, the terminal is located with being tilted at a specified angle, and thereby the user is able to have the terminal in sight. In this case, if the event is generated, the user can see a preset alert information by just looking.

Especially, in case that an application of the mobile terminal is executed and the mobile terminal is tilted at a specified angle, if the event is generated, a preset alert information is superimposed (overlaid) on the executed application screen of the mobile terminal. In another exemplary embodiment of the present invention, a specific application may be performed in addition to the preset alert information to provide notification of event generation in the designated condition. For example, considering the specific application for activation and control of the camera when an event is generated in the designated condition, the controller 100 activates and controls the camera 150 as shown in FIG. 1. That is, the camera application is executed according to the user's request while tilting the mobile terminal within the specified angle, and then the event is generated. A real environmental image photographed by the camera 150 may be superimposed with an icon representing the alert information (for example, an envelope icon for a message and an email and/or a phone icon for an incoming call) and displayed on the screen, which provides a sensitive alert.

However, if the terminal is not in the designated condition when the event is generated (i.e., the terminal is positioned at an angle other than a designated angle), the controller 100 pops up the default alert information.

Figure 5:
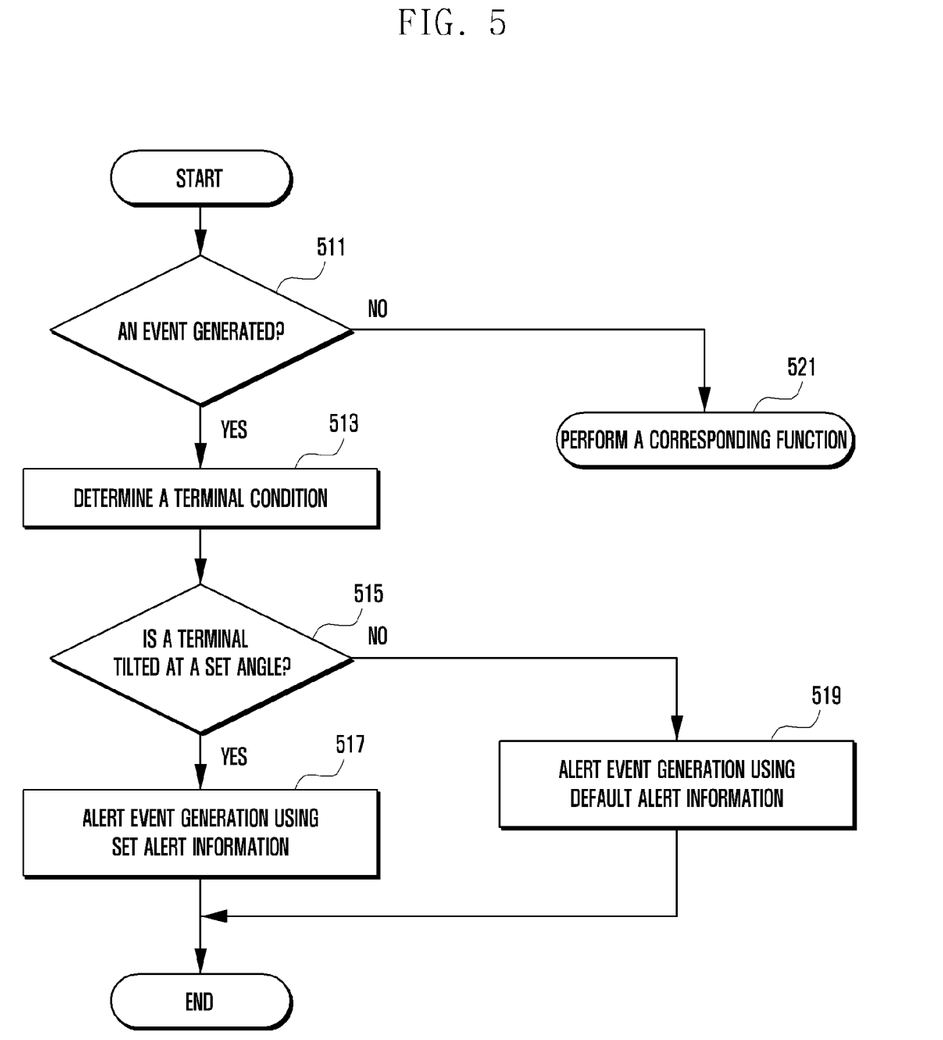
FIG. 5 is a view illustrating a procedure for displaying event generation in a designated state of a portable terminal according to an exemplary embodiment of the present invention.

FIG. 5 is a flow diagram illustrating a procedure for displaying event generation in a designated state of a portable terminal according to another exemplary embodiment of the present invention.

Referring to FIG. 5, the user may register the set alert information for notifying the event generation in the designated condition. In this case, the set alert information may be, for example, the execution of the specific application and/or displaying of an image of a corresponding event (for example, an icon or a specific thumbnail image), and/or a sound (for example, music set by the user). It is possible to set alert information may be set during the manufacturing stage. Therefore, when the memory 110 stores the event alert information, the memory 110 may also respectively store the set alert information and default alert information.

When the event is generated in the above condition, the controller 100 detects this (511) and detects the condition of the terminal (513). In this case, the event may be detecting receipt of a message (SMS or MMS), an email, an incoming call or generation of SMS feeds (Facebook, Twitter). Next, the controller 100 determines whether the terminal is in the designated condition (515). In this case, the designated condition may indicate a condition in which the terminal is mounted on the cradle and is tilted within a set angular range. In this case, the condition in which the terminal is mounted on the cradle may be identified through the cradle detection unit 135 of the terminal condition detection unit 130, and the condition in which the terminal is tilted within the set angular range may be determined through the position detection unit 133. The designated condition may be a case that satisfies either one or both of the above two conditions.

When the terminal is in the designated condition, i.e., having a tilt within the set angular range, the controller 100 detects this at step 515 and accesses and displays the alert information set for a corresponding event generation from memory 110 (517). When the set alert information includes execution of a specific application, the controller 100 executes the corresponding application at step 517 and overlays an image of the set alert information on an execution screen of the application using display unit 145, thereby displaying the event generation.

In operation, assuming that the specific application to driving the camera 150 and the event is receiving the message, the alert information displayed on the display unit 145 may have the same form as shown in FIG. 4. However, if the terminal is not in the designated condition at step 515, the controller 100 pops up the default alert information on display unit 145 (519).

Figure 6:
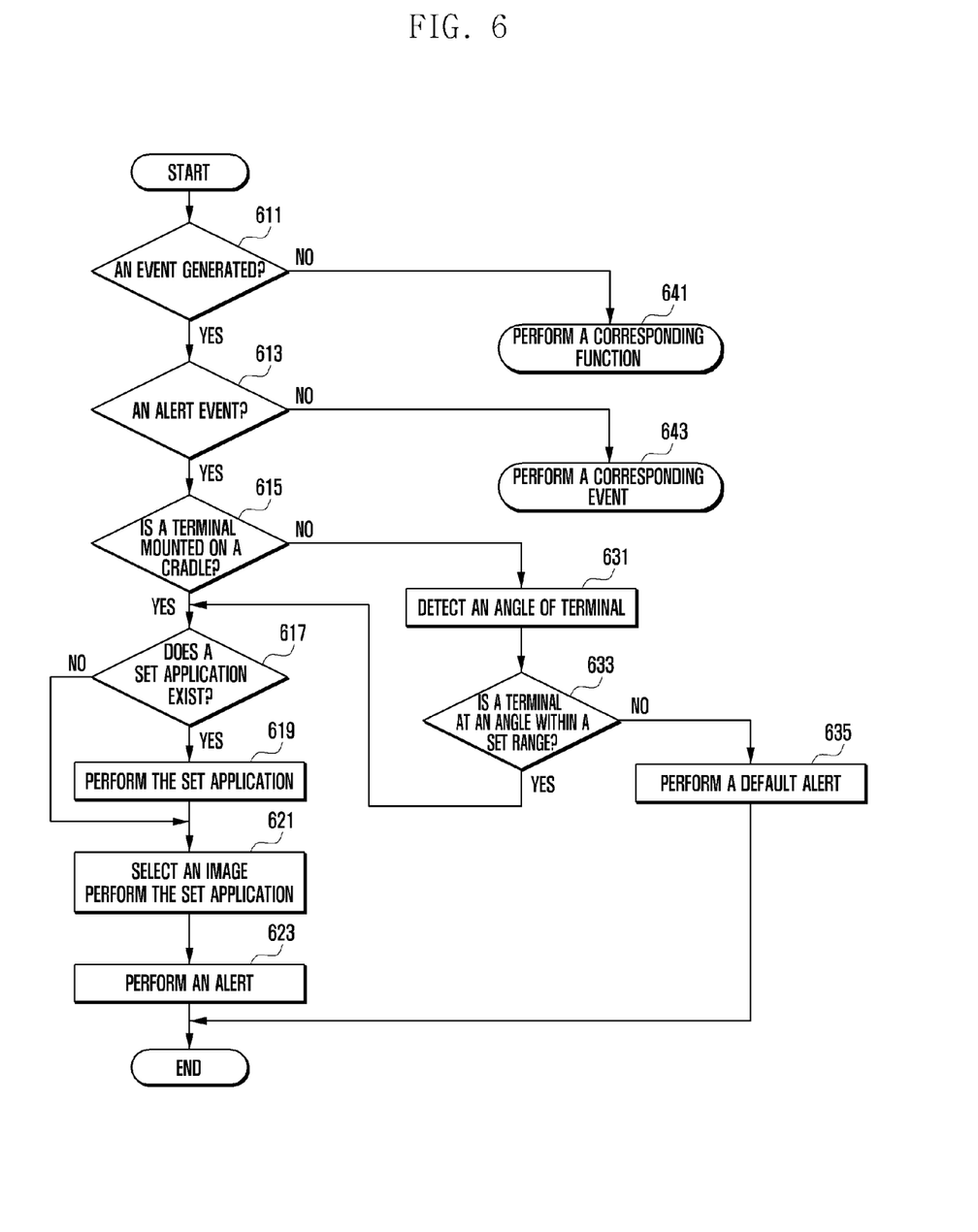
FIG. 6 is a flow chart illustrating a procedure for displaying alert information when an event is generated in a portable terminal according to an exemplary embodiment of the present invention.

FIG. 6 is a flow chart illustrating a procedure for displaying alert information when an event is generated in a portable terminal according to an exemplary embodiment of the present invention.

Referring to FIG. 6, the controller 100 detects (611) when an event is generated, and examines whether the generated event is an event that requires an alert (613). In this case, the alert event may be, for example, receiving the message, generation of a received signal, or generation of SNS feeds. When the generated event is detected as the alert event at step 613, the controller 100 analyzes an output of the cradle detection unit 135 to examine whether the terminal is mounted on the cradle, i.e., in the designated condition (615). When the terminal is mounted on the cradle, the controller 100 determines whether an application is set by identifying the alert information of a corresponding event in the memory 110 (617). The camera application is executed in a state that the mobile terminal is tilted within a specified angle, and then the event is generated. In this case, the application may be activating and controlling the camera 150. If the application is set, the controller 100 executes a corresponding application (such as activating and controlling the camera) (619), selects the image set in the alert information (In this case, an icon set for a corresponding event), and overlays the icon set for the alert information on an image photographed by the camera which is displayed (623). If the set alert information has sound information, the controller 100 outputs the sound at step 623. If the set application does not exist at step 617, the controller 100 performs steps 621 and 623 to display the set icon and/or sound of the corresponding event.

However, if the terminal is not mounted on the cradle at step 515, the controller 100 detects the angle at which the terminal is tilted and any movement thereof through use of the position detection unit 133 (631). Here, if the angle of tilt is within a set angular range, the controller 100 detects this (633) and proceeds to step 617. In an exemplary embodiment of the present invention, if the terminal maintains the tilt within the set angular range and does not have movement for a predetermined time, such a condition may be set as the designated condition. This condition may correspond to a case where the portable terminal is not mounted on the cradle but mounted on a decorative cradle which is similar to the cradle. In other words, if the cradle is not used when using the terminal (such as with a current smart phone), the user may purchase the decorative support to mount the portable terminal thereon. When the portable terminal is mounted on the decorative support, the controller 100 may detect whether the portable terminal maintains the tilt within the set angular range and does not have movement for a predetermined time.

If the terminal is not mounted on the cradle, or the terminal does not maintain its angle within the set angular range, or movement is detected even if the terminal maintains the angle within the set angular range, the controller 100 detects this at step 633 and produces a notification of the event generation by using the default alert information (635).

According to the present invention, the function of displaying different types of alerts according to a condition of a portable terminal at a time point when an event is generated, is provided even if the same event is generated in the portable terminal. Also, an alert function may be performed by generating various types of events according to the condition of the terminal, and the generation of an event may be displayed with sensitivity by performing an additional interaction or step when the event is generated.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although exemplary embodiments of the present invention have been described in detail above, it should be clearly understood that there are many variations and modifications of the basic inventive concepts taught herein which may appear to those of ordinary skill in the art to still fall within the spirit and scope of the present invention, as defined in the appended claims.

What is claimed is:

1. A portable terminal having a display unit, apparatus comprising:
 a communication unit to detect an event;
 a terminal condition detection unit to detect a designated condition, the designated condition comprising the terminal being tiled within a range of tilt angles that allow a display screen of the terminal to be viewable at different angles while the terminal is mounted securely on a cradle; and
 a controller to:
 detect an output from the terminal condition detection unit to identify whether the terminal is in the designated condition; and
 generate preset alert information in lieu of default alert information, when the terminal is in the designated condition when the event is detected with the communication unit.

2. The portable terminal of claim 1, wherein the terminal condition detection unit determines the designated condition when the terminal is tilted within a predetermined angular range.

3. The portable terminal of claim 1, wherein the terminal condition detection unit is a cradle detection unit configured to detect whether the portable terminal is mounted on the cradle.

4. The portable terminal of claim 3, further comprising:
 a position detection unit configured to detect an angle of tilt and movement of the terminal and configured to generate a designated condition detection signal when no movement is detected while the angle of tilt is within the range of tilt angles.

5. The portable terminal of claim 4, wherein the position detection unit is an acceleration sensor.

6. The portable terminal of claim 5, wherein the range of tilt angles is between 60 to 105 degrees.

7. The portable terminal of claim 2, wherein the alert information of the designated condition is stored in a memory and comprises execution of an application and set icon information.

8. The portable terminal of claim 7, wherein the controller executes the application in the designated condition and overlays an icon on the display screen according to the execution of the application.

9. The portable terminal of claim 8, wherein the application is activating and controlling a camera.

10. The portable terminal of claim 9, wherein the event is receiving a message, a call or SNS feeds.

11. An alert method in a portable terminal, the alert method comprising:
 examining an output of a terminal condition detection unit with a controller, when an event is detected by a communication unit, to identify whether the portable terminal is in a designated condition, the designated condition comprising the terminal being tiled within a range of tilt angles that allow a display screen of the terminal to be tilted and to be viewable at different angles while the terminal is mounted securely on a cradle; and displaying preset alert information in lieu of default alert information, when the event is detected and the portable terminal is in the designated condition.

12. The alert method of claim 11, further comprising determining, by terminal condition detection unit, whether the portable terminal is mounted on the cradle.

13. The alert method of claim 12, further comprising determining by the terminal condition detection unit, whether there is any movement of the portable terminal.

14. The alert method of claim 13, wherein the range of tilt angles is between 60 to 105 degrees.

15. The alert method of claim 13, wherein the alert information of the designated condition is stored in a memory and comprises execution of an application and set icon information.

16. The alert method of claim 15, wherein the displaying of the alert information of the designated condition comprises:
executing the application and overlaying an icon on the display screen.

17. The alert method of claim 16, wherein the application is activating and controlling a camera.

18. The alert method of claim 17, wherein the event is receiving a message, a call or SNS feeds.

* * * * *

UNITED STATES PATENT AND TRADEMARK OFFICE
CERTIFICATE OF CORRECTION

| | |
|---|---|
| PATENT NO. | : 8,947,250 B2 |
| APPLICATION NO. | : 13/670577 |
| DATED | : February 3, 2015 |
| INVENTOR(S) | : Kyunghwa Kim |

It is certified that error appears in the above-identified patent and that said Letters Patent is hereby corrected as shown below:

In the Claims

Column 8, Claim 1, Line 22 should read as follows:
--...being tilted within a...--

Column 9, Claim 11, Line 3 should read as follows:
--...being tilted within a...--

Signed and Sealed this
Fifth Day of May, 2015

Michelle K. Lee
*Director of the United States Patent and Trademark Office*